(12) United States Patent
Kay et al.

(10) Patent No.: US 10,742,493 B1
(45) Date of Patent: Aug. 11, 2020

(54) REMOTE NETWORK INTERFACE CARD MANAGEMENT

(71) Applicant: HEWLETT PACKARD ENTERPRISE DEVELOPMENT LP, Houston, TX (US)

(72) Inventors: Stephen Kay, Tomball, TX (US); Long Sam, Tomball, TX (US); Christopher Murray, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 11 days.

(21) Appl. No.: 16/266,850

(22) Filed: Feb. 4, 2019

(51) Int. Cl.
| | |
|---|---|
| *H04L 12/24* | (2006.01) |
| *H04L 12/46* | (2006.01) |
| *H04L 12/26* | (2006.01) |
| *H04L 12/933* | (2013.01) |
| *H04L 29/06* | (2006.01) |
| *H04L 12/803* | (2013.01) |

(52) U.S. Cl.
CPC ...... *H04L 41/0806* (2013.01); *H04L 12/4641* (2013.01); *H04L 41/08* (2013.01); *H04L 41/0893* (2013.01); *H04L 43/0811* (2013.01); *H04L 47/125* (2013.01); *H04L 49/15* (2013.01); *H04L 63/16* (2013.01); *H04L 63/18* (2013.01)

(58) Field of Classification Search
CPC . H04L 41/0806; H04L 41/08; H04L 41/0893; H04L 63/18; H04L 63/16; H04L 49/15; H04L 43/0811; H04L 49/1507; H04L 49/455; H04L 12/4641
See application file for complete search history.

(56) References Cited

U.S. PATENT DOCUMENTS

| | | | | |
|---|---|---|---|---|
| 10,616,142 | B2* | 4/2020 | Vu | ...................... H04L 49/1576 |
| 2003/0152075 | A1* | 8/2003 | Hawthorne, III | ... H04L 12/4641 370/389 |
| 2011/0145630 | A1* | 6/2011 | Maciorowski | ...... G06F 11/2007 714/4.11 |
| 2015/0156117 | A1* | 6/2015 | Zhao | ..................... H04L 47/125 709/223 |

(Continued)

OTHER PUBLICATIONS

Hewlett Packard Enterprise, "HPE Synergy Management Infrastructure", Feb. 2016.*

*Primary Examiner* — Ramy M Osman
(74) *Attorney, Agent, or Firm* — Nolte Intellectual Property Law Group (57) ABSTRACT

Remote configuration of network interface cards (NICs) on appliances of a scaleable compute resource such as a frame-based system is disclosed. Frames may include a frame link module (FLM). Remote configuration of NICs may allow for multiple networks to be maintained in physical or logical isolation from each other. For example, a management data network may be maintained independently of an application data network. An FLM CPU may detect an appliance, validate compatibility for the appliance, a midplane, a PHY connection, etc. Commands from the FLM CPU may configure the independent networks. Independent networks may provide redundancy and segregation by data type. A controller area network (CAN) bus may deliver configuration commands to a NIC of an attached appliance. Air gap equivalent isolation of networks based on type of network may be achieved while maintaining redundancy of networks to address potential failure of individual components.

16 Claims, 8 Drawing Sheets

(56) References Cited

U.S. PATENT DOCUMENTS

2019/0075158 A1* 3/2019 Sun ................... H04L 67/1004
2019/0116135 A1* 4/2019 Vu ......................... H04L 49/15
2019/0327173 A1* 10/2019 Gafni ................... H04L 47/125
2019/0335386 A1* 10/2019 Murray ................. H04L 41/12

* cited by examiner

REMOTE NETWORK INTERFACE CARD MANAGEMENT

BACKGROUND

In the field of scalable compute resources, network connectivity between nodes, blades, or frames of adjacent network modules may represent a primary communication path for sharing data between those nodes. The data may represent inputs to a compute process (e.g., data or applications), outputs of compute resources (e.g., compute results), communications to coordinate distributed processes, and other types of data. In some architectures, adjacent nodes of network modules within a blade server, cluster, or frame may be expected to be directly connected to each other using a control network to exchange coordination information amongst the set of devices working together. This control network, sometimes referred to as a management network, may be isolated from regular data traffic on an application network, sometimes referred to as a customer network, using a separate physical local area network (LAN) or logical network (e.g., virtual local area network ULAN).

In some systems, there may be more than one control network. Each control network may communicate across different physical media using an independent network interface card (NIC) port or may share a physical media using logical segregation. Different topology networks may be used, e.g., ring networks, star networks, point-to-point, etc. Control signals may use a LAN, VLAN, control area network (CAN), or other type of network. Additionally, some scalable compute resources may maintain a single active uplink from the group of resources and have multiple backup uplinks. For example, a single uplink to a customer network may be used to provide an application data communication path. In some customer environments, segregation of application data and the management network data that is used to monitor, configure, and control devices is desirable for a variety of reasons including performance, reliability, and security.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

At a high-level, disclosed techniques isolate management traffic, within and between components of a scaleable compute resource from application data traffic. Scaleable compute resources include, for example, a set of frames or a blade server with plugin components. As referenced here, both management traffic and application data traffic refer to network style communication between components to support overall functionality of a scaleable compute resource. Management traffic includes, among other data, control commands to direct power usage and cooling (e.g., fan control) at different components within a computer system.

For simplicity, the examples of this disclosure will be presented using Frames, Frame Link Modules (FLMs), Midplanes (e.g., a cross communication bus), and appliances (sometimes referenced as servers (e.g., the appliances are connected through the PHY to servers or blade server)). However, disclosed techniques may also be applicable to other types of scaleable compute resources. Other types of scaleable compute resources will have components that may be named differently but provide substantially similar functionality to the components used in disclosed examples. Accordingly, this disclosure is not limited to a Frame style implementation.

In one example implementation, two new communication ports may be added (e.g., as a multi-port NIC) to each appliance to allow data traffic from internal appliances (e.g., appliances plugged into a Frame) to be sent through the data network without entering the FLM switch. The FLM switch may additionally route packets between the internal management devices and to the external management network.

Figure 2A:
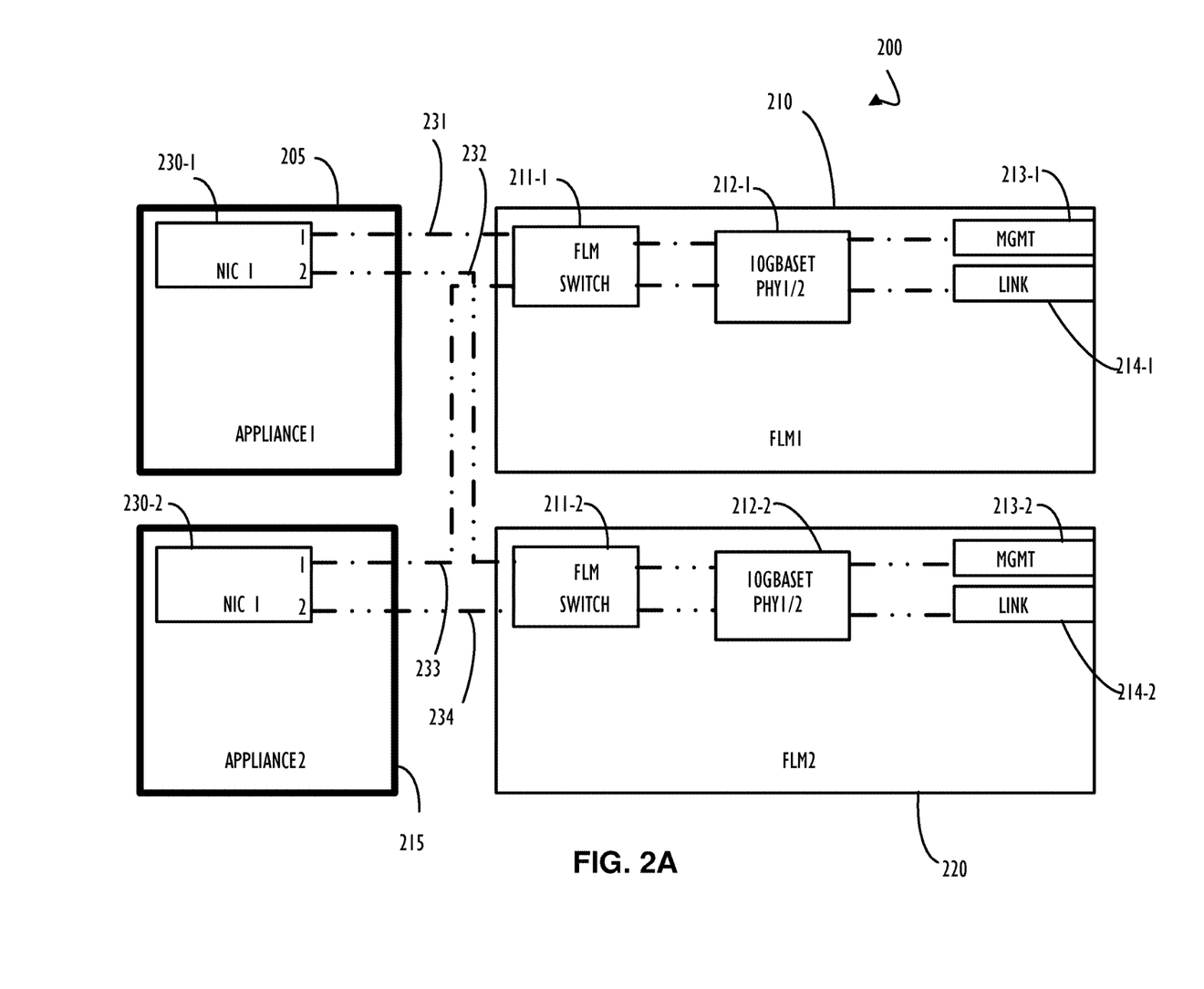
FIG. 2A is a functional block diagram representing an example of two frame link modules redundantly connected to two appliances that each have a single NIC having two ports, according to one or more disclosed implementations.
Figure 2B:
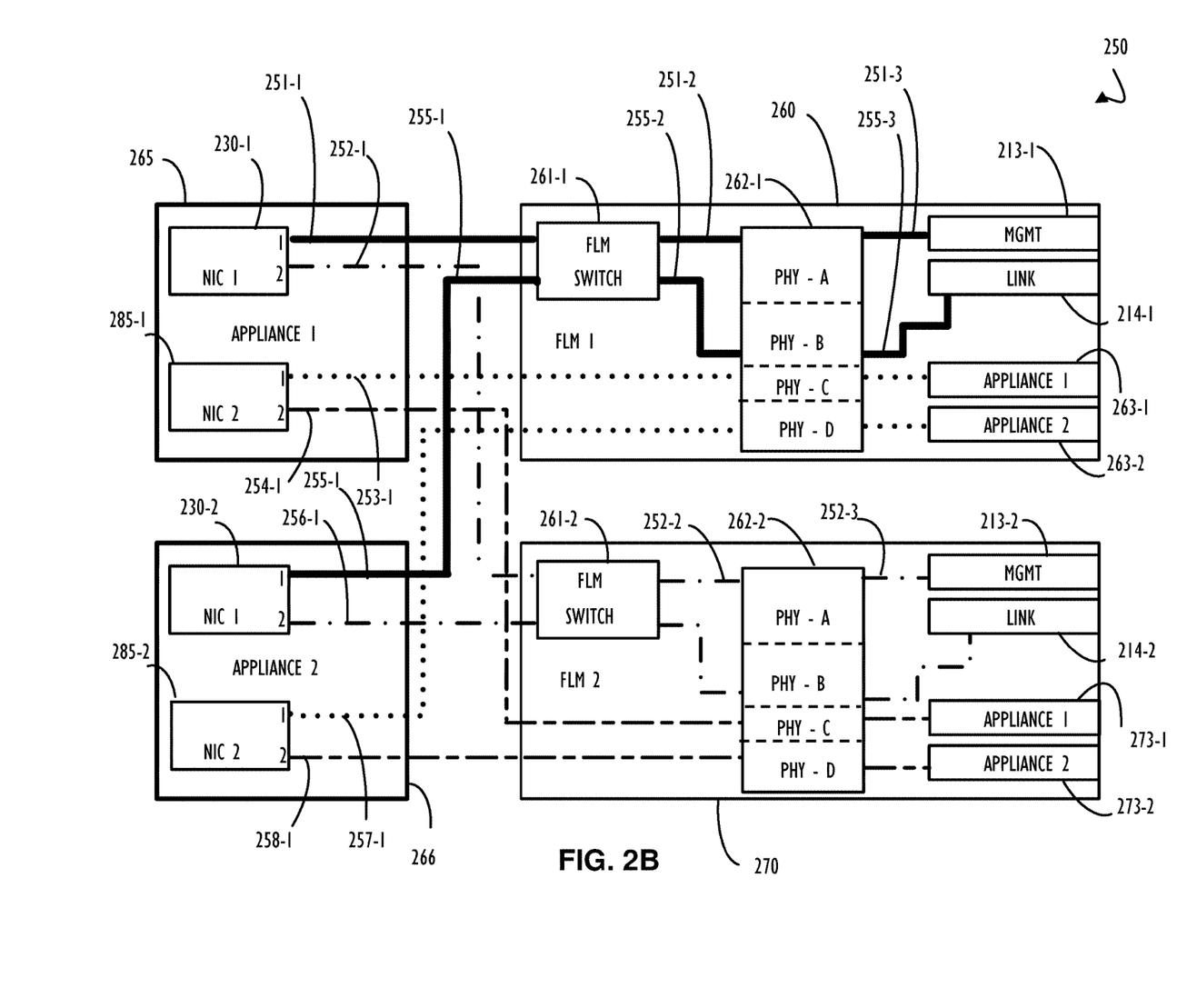
FIG. 2B is a functional block diagram extending the example of FIG. 2A with each of two appliances having multiple NICs with two ports each, according to one or more disclosed implementations.

One example of adding communication ports and data flow paths is illustrated in FIGS. 2A-B discussed further below. Specifically, FIG. 2A illustrates an implementation without the additional ports and FIG. 2B illustrates the additional ports and communication paths. It is additionally worth noting here that one or more disclosed implementations may be accomplished without changes to other infrastructure components (e.g., existing Midplane components may be utilized without change).

According to disclosed examples, using at least two new communication paths from an appliance, data may be routed between new NIC ports (for example) to the FLM and the appropriate one of a management network or an application data network. New communication paths may allow remote management through existing channels to the appliance.

In one example implementation, data may bypass a management switch (within each FLM) as opposed to only being isolated using VLANs. Thus, a higher degree of security, sometimes referred to as "air gap" security may be achieved. In solutions without air gap isolation, management data may have traversed the FLM switch prior to being isolated within logically segregated VLANs. To accomplish an air gap solution, a CPU on the FLM may control PHY ports that are routed to the remote NIC ports of each appliance. Control of a PHY may be accomplished using management software that has an additional communication path through a control area network (CAN) bus. The CAN bus may be communicatively coupled to the CIM using CANMICs. See the discussion of FIGS. 3A-4 below. In short, an FLM CPU, possibly acting as a CAN master and communicating to CAN slaves on an appliance, may control PHY setup using control commands through a CAN bus that bypasses the FLM switch.

As a result of the additional and physically segregated (air gapped) communication paths, a solution providing an air gapping between the management traffic and the data traffic of the appliance may be achieved. As a result, disclosed implementations that include an air gap isolation provide a computer system where an increased security level may be achieved. Accordingly, these and other disclosed implementations represent an improvement to the functionality of a computer system, specifically with respect to data isolation and data security.

More discussion of a CAN and CANBUS communications is available in U.S. Pat. No. 10,055,322, entitled "Interpreting Signals Received from Redundant Buses," issued Aug. 21, 2018, to Alex Gunnar Olson, which is incorporated by reference herein for all applicable purposes.

Having an understanding of the above overview, this disclosure now explains at least one non-limiting example implementation (and possible variants thereof). This example implementation is explained with reference to the figures that include: a functional block diagram of a system including multiple nodes of a scaleable resource that may benefit from the concepts of this disclosure (FIG. 1); a first example of two functional block diagrams illustrating an example implementation using two appliances that have a single NIC contrasted with an example implementation using two appliances that each have two NICs to facilitate isolation of different networks (FIGS. 2A-B); a second example of two functional block diagrams illustrating a shared common network and two isolated networks (FIGS. 3A-B); a functional block diagram illustrating two servers (appliances), each having a NIC and a control area network microcontroller (CANMIC), a midplane, and a frame link module, with different possible communication paths (FIG. 4); a flow chart depicting one example method for configuring components of FIG. 4 to isolate data from a management network and a customer data network (FIG. 5); and an example computing device instrumented with computer instructions to perform the method of FIG. 5 (FIG. 6) (all according to different possible disclosed implementations).

Figure 1:
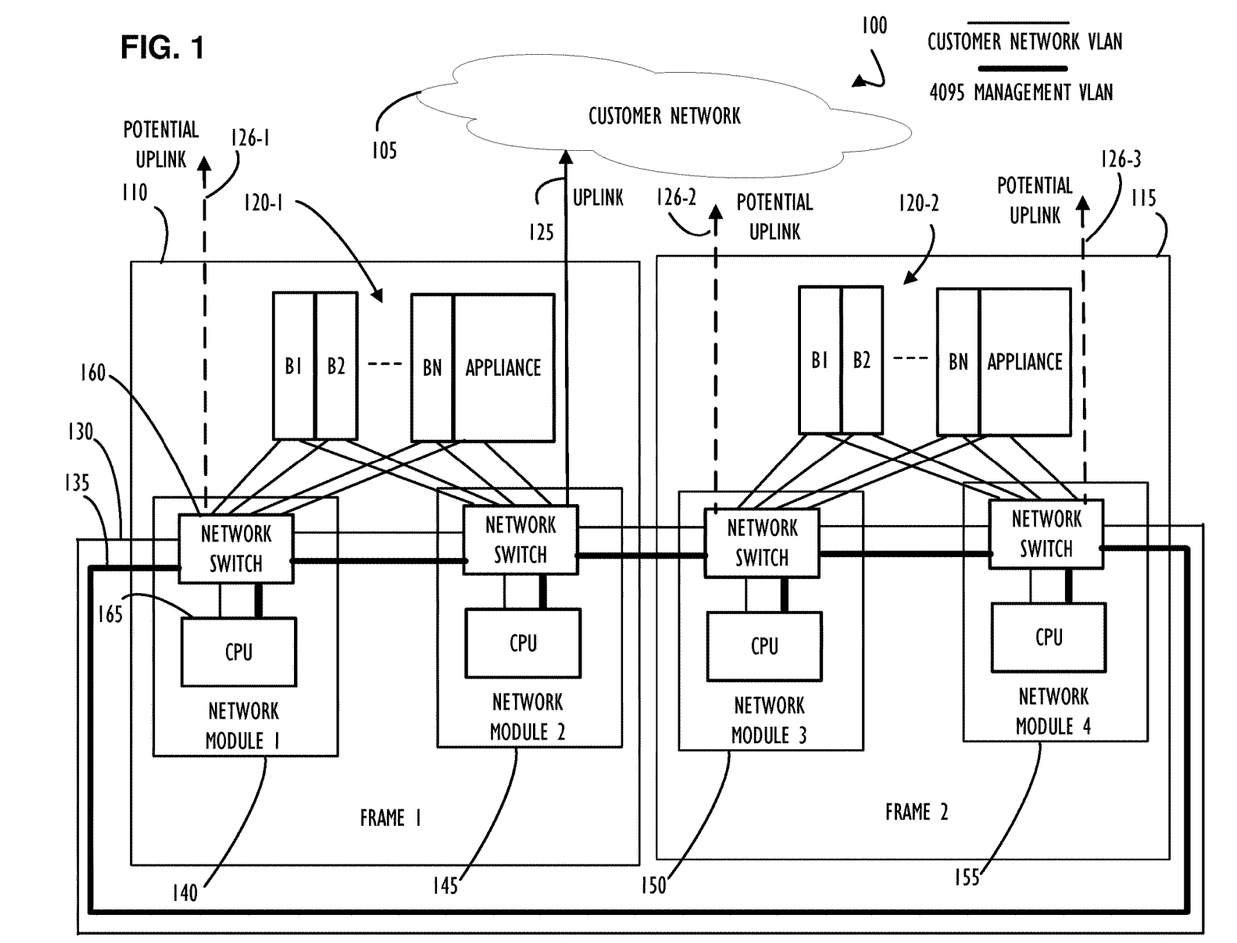
FIG. 1 is a functional block diagram of a computer infrastructure including multiple frame saleable compute resources, a customer VLAN, and a management VLAN, according to one or more disclosed implementations.

Referring to FIG. 1, an example computer infrastructure 100 is illustrated. In this example, customer network 105 is connected to a set of frames (represented by frame 1 (110), and frame 2 (115)). Of course, more than two frames may be present but for simplicity of this disclosure only two are shown in this example. As indicated by arrow 120-1, frame 1 may be configured with a set of blades (B1, B2, . . . BN) and an Appliance. There may be more than one Appliance within a single frame. Similarly, arrow 120-2 indicates that frame 2 may be configured in a like manner. Frame 1 further includes two network modules, namely network module 1 (140) and network module 2 (145) (sometimes referred to as a Frame Link Module (FLM)). Frame 2 also include two network modules, namely network module 3 (150) and network module 4 (155). These network modules provide connectivity for the compute resources represented by the respective blades within their frame. Each of the blades is shown with a network connection to a network switch 160 respectively disposed within each individual network module (e.g., network module 1 (140) through network module 4 (155)). Each network module further includes a CPU 165 to facilitate configuration, monitoring, and maintenance of a corresponding network switch 160. As mentioned above, a blade may be referred to as an appliance or a server. In any case, a blade, appliance, server, in this context refers to a "plugin" component to a scaleable compute resource to provide additional compute capacity (or functionality) for the scaleable compute resources. Many different types of components may be used to augment a scaleable compute resource and each may be configured with redundant and isolated communication paths as disclosed herein. Specific functionality provided by these blades is not necessarily pertinent to this disclosure as disclosed techniques for control network isolation may be agnostic to functionality provided by any particular plugin component. Additionally, "plugin," as used herein, may refer to insertion of a card into a slot in a backplane of a computer system, may represent attachment via a communication cable, may represent one of many other types of connections used for computer system component attachment.

Connectivity from a set of frames to a customer network is typically provided by a single active uplink 125 from one of the plurality of network switches that exist across the multiple FLMs of a group of connected frames. That is, all communications external to the group of connected frames passes through uplink 125. Other potential uplinks 126-1, 126-2, and 126-3 are illustrated to be available (e.g., if needed as a result of failure to uplink 125) from other network switches.

As further illustrated in computer infrastructure 100, customer network VLAN 130 connects each of the network switches 160 in an ethernet ring topology network and extends to the customer network 105 (e.g., includes VLANS 1-4094). A second ring network, 4095 management VLAN 135, is also shown as a logically isolated network in computer infrastructure 100. 4095 management VLAN 135 is shown in a bolder line than customer network VLAN 130 and also connects each of the network switches 160. Note, in a proper configuration of a group of frames, each network switch will be directly connected to each neighboring switch (either in the same frame or an adjacent frame) and no intervening network devices are present.

A virtual LAN (VLAN) refers to a broadcast domain that is partitioned and isolated (i.e., logically isolated) in a computer network at the data link layer (OSI layer 2). LAN is the abbreviation for local area network and when used in the context of a VLAN, "virtual" refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example 4095 management VLAN 135 in computer infrastructure 100. Note, a VLAN does not represent an "air gap" isolation of data traffic on a physical network from other VLANs on that same physical network. To achieve proper air gap isolation, a separate physical layer network may be used as explained below with reference to FIGS. 2B, 3B, and 4.

Referring now to FIG. 2A a functional block diagram illustrates communication flows 200 representing an example of two logically isolated networks (e.g., a management network and a data network), according to one or more disclosed implementations. In this example, two frame link modules (FLM 1 210 and FLM 2 220) are redundantly connected to two appliances (appliance 1 (205) and appliance 2 (215). Each appliance, in this example, has a single NIC having two ports. Specifically, appliance 1 (205) includes NIC 1 (230-1) that has a first port and a second port as labeled in communication flow 200. Appliance 2 (215) similarly includes NIC 1 (230-2) with two ports. FLM 1 (210) includes an FLM switch 211-1, a multi-PHY communications capability (e.g., a multi-port PHY 212-1), a management connection 213-1 and a link connection 214-1. FLM 2 (220) is similarly configured with an FLM switch 211-2, multi-port PHY 212-2, management connection 213-2, and link connection 214-2.

There are four logically independent (and redundant) communication paths illustrated for communication flows 200. Communication paths originating from a first port on a NIC are illustrated as dash-single-dot lines, for example, communication path 1 (231) and communication path 3 (233). Communication paths originating from a second port on a NIC are illustrated as dash-double-dot lines, for example, communication path 2 (232) and communication path 4 (234). In this example, communication path 1 (231) flows from NIC 1 (230-1) of appliance 1 (205) to FLM switch 211-1 of FLM 1 (210). Communication path 2 (232) flows from NIC 1 (230-1) of appliance 1 (205) to FLM switch 211-2 of FLM 2 (220). One of ordinary skill in the art, given the benefit of this disclosure, will recognize that this is only one possible data path for network data because FLM switch 211-2 of FLM 2 (220) would route traffic to its appropriate destination as indicated in the network packet. For example, heartbeat messages may be exchanged between appliance 1 (205) and appliance 2 (215). Heartbeat message would then flow out of appliance 1 (205) into one of the two FLM Switches (211-1 or 211-2) and then flow out of that FLM Switch to a port on NIC 1 (2302) of appliance 2 (215). In this example, however, communication path 3 (233) flows from NIC 1 (230-2) of appliance 2 (215) to FLM switch 211-1 of FLM 1 (210). Communication path 4 (234) flows from NIC 1 (230-2) of appliance 2 (215) to FLM switch 211-2 of FLM 2 (220). In this manner, each of appliance 1 (205) and appliance 2 (215) have redundant communication paths (for failover redundancy and high-availability for example) between each of FLM 1 (210) and FLM 2 (220).

In this example, management data flow may be isolated from application data flow at each multi-port PHY to arrive at management interface 213-1 of FLM 1 (210) and management interface 213-2 of FLM 2 (220). Application data flow may be directed out of each multi-port PHY to link connection 214-1 in FLM 1 (210) and link connection 214-2 of FLM 2 (220). The link ports associated with link connection 214-2 link the frames together in a ring to form a management network. Thus, the FLM switch may perform logical data segregation by directing appropriate traffic (e.g., management or application data) to the appropriate PHY on multi-port PHY 212-1 of FLM 1 (210) or multi-port PHY 212-2 of FLM 2 (210).

FIG. 2B is a functional block diagram extending the example of FIG. 2A with each of two appliances having multiple network interface cards with two ports each, according to one or more disclosed implementations. FIG. 2B illustrates communication flows 250 representing an example of two physically isolated networks (e.g., a management network and a data network separated by an air gap for enhanced security). Redundant communication paths are maintained to provide high-availability. This example is similar to the example of FIG. 2A because two frame link modules (FLM 1 260 and FLM 2 270) are redundantly connected to two appliances (appliance 1 (265) and appliance 2 (266). However, in this example, each appliance has dual NICs each having two ports.

Specifically, appliance 1 (265) includes NIC 1 (230-1) that has a first port and a second port and NIC 2 (285-1) that has a first port and a second port, each as labeled in communication flow 250. Appliance 2 (266) similarly includes NIC 1 (230-2) with two ports and NIC 2 (285-2). FLM 1 (260) includes an FLM switch 261-1, a multi-PHY communications capability (e.g., a multi-port PHY 262-1), a management connection 213-1 and a link connection 214-1. FLM 2 (270) is similarly configured with an FLM switch 261-2, multi-port PHY 262-2, management connection 213-2, and link connection 214-2.

In contrast to FIG. 2A, each of FLM 1 (260) and FLM 2 (270) further include additional interfaces. FLM 1 (260) includes a segregated PHY that has four interfaces (i.e., PHY-A, PHY-B, PHY-C, and PHY-D) on each of multi-port PHYs 262-1 and 262-2. On each of these PHYs, a selected PHY from PHY-A through PHY-D may provide a physically isolated (and additional) communication path to each of appliance 1 and appliance 2. Namely, FLM 1 (260) includes interface to appliance 1 (263-1) and interface to appliance 2 (263-2). FLM 2 (270) includes interface to appliance 1 (273-1) and interface to appliance 2 (273-2).

In communication flows 250, there are eight independent communication paths illustrated (as opposed to the four in communication flows 200). Again, one of ordinary skill in the art, given the benefit of this disclosure, will recognize that these specific communication paths are examples only and that data may be switched within FLM Switch 261-1 or 261-2 to follow different flow paths than the eight specifically illustrated. That is, an FLM switch may direct traffic based on its destination information as included in an individual network packet to the appropriate outbound port of the FLM switch. These additional communication paths may be utilized to provide full air gap security and segregation of management traffic and application data traffic, according to one or more disclosed implementations. For example, air gap security may be provided by PHY C and PHY D, while PHY A and PHY B send all management traffic. The eight communication paths illustrated in communication flows 250 include: communication paths originating from a first port on a first NIC illustrated as a bold line, for example, communication path 1 (251-1, 251-2, and 251-3) and communication path 5 (255-1). Communication paths originating from a second port on a first NIC are illustrated as dash-single-dot lines, for example, communication path 2 (252-1, 252-2, and 252-3) and communication path 6 (256-1). Communication paths 1, 2, 5, and 6, are similar to communications paths 1-4, respectively, of FIG. 2A.

Additional communication paths (relative to FIG. 2A) are illustrated in communication flows 250 of FIG. 2B and originate from each of the additional NICs provided in each of appliance 1 (265) and appliance 2 (266). Communication path 3 (253-1) and communication path 7 (257-1) respectively originate at port 1 of a second NIC (e.g., NIC 2 (285-1 and 285-2)) and are illustrated as a long-dash-short-dash line. Communication path 4 (254-1) and communication path 8 (258-1) respectively originate at port 2 of the second NIC (e.g., NIC 2 (285-1 and 285-2)) and are illustrated as a bold dotted line. In this manner, each of appliance 1 (265) and appliance 2 (266) may utilize a data flow on a communication path that both bypasses each respective FLM switch (261-1 and 261-2) and isolate management traffic from link traffic on different ports of each multi-port PHY (262-1 and 262-2).

Specifically, management traffic from appliance 1 (265) intended for management interface 213-1 of FLM 1 (260) may follow communication path 1 (251-1, 251-2, and 251-3). This data would flow from appliance 1 (265), via NIC 1 (230-1) port 1, to FLM switch 261-1, to PHY-A on multi-port PHY 262-1 prior to reaching management interface 213-1 on FLM 1 (260). For redundancy and fault tolerance, for example, management traffic from appliance 1 (265) may have an additional communication path (i.e., communication path 2 (252-1, 252-2, and 252-3)) using FLM 2 (270). As illustrated, communication path 2 (252-1, 251-2, and 251-3) may flow from appliance 1 (265), via NIC 1 (230-1) port 2, to FLM switch 261-2, to PHY-A on multi-port PHY 262-2 prior to reaching management interface 213-2 on FLM 2 (270). Appliance 2 (266) is also illustrated, in communication flows 250, as having similar redundant communication paths for management traffic using communication path 5 (255-1, 255-2, and 255-3) and communication path 6 (256-1) respectively from a first port and a second port of NIC 1 (230-2).

Continuing with this example, application data traffic may be completely and physically isolated from each of communication path 1 (251 (segments 1, 2, and 3)), communication path 2 (252 (segments 1, 2, and 3), communication path 5 (255 (segments 1, 2, and 3), and communication path 6 (256 (only segment 1 is labeled for clarity but there are three segments illustrated)) that are used. Specifically, application data for appliance 1 (265) may utilize communication path 3 (253-1) to flow from appliance 1 (265), via NIC 2 (285-1) port 1 through PHY-C of multi-port PHY 262-1 and arrive at appliance 1 interface 263-1 on FLM 1 (260). Redundant application data for appliance 1 (265) may utilize communication path 4 (254-1) to flow from appliance 1 (265), via NIC 2 (285-1) port 2 through PHY-C of multi-port PHY 262-2 and arrive at appliance 1 interface 273-1 on FLM 2 (270). Application data for appliance 2 (266) may utilize communication path 7 (257-1) and communication path 8 (258-1) from NIC 2 (285-2) on appliance 2 (266) to provide similar redundant paths as those explained for application data from appliance 1. The exception to the similarity is that in this example communication path 8 would flow through PHY-D of FLM 2 (270) multi-port PHY 262-2 (rather than PHY-C). Accordingly, complete physical isolation of management traffic and application data traffic using a frame-based scaleable compute resource may be achieved. One of ordinary skill in the art, given the benefit of this disclosure, would recognize that names of PHYs used in this example are arbitrary and no special meaning is implied by the letters "A-D" other than to show there are four independent PHYs on each of multi-port PHYs 262-1 and 262-2.

Figure 3A:
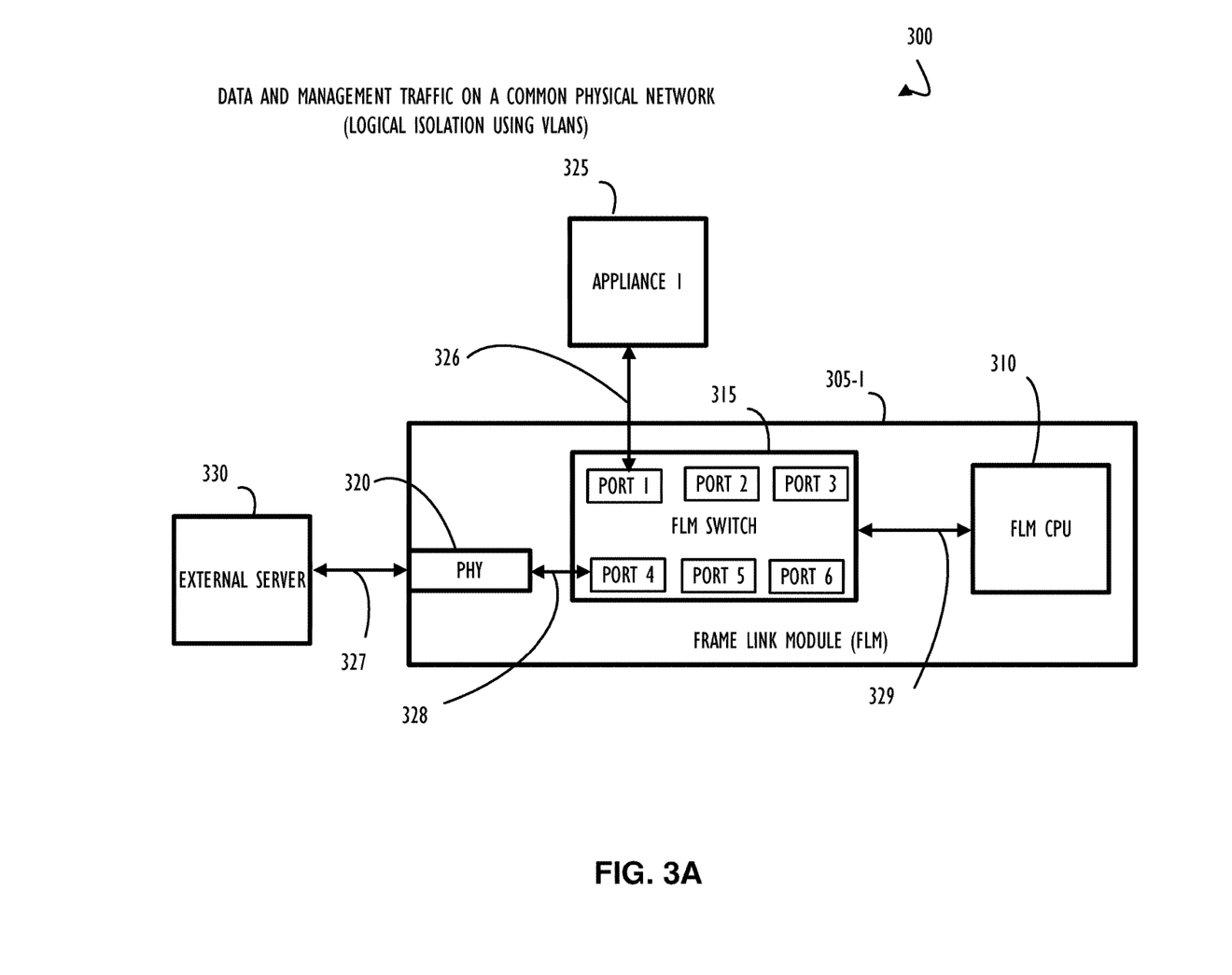
FIG. 3A is a functional block diagram illustrating communication flow where data and management traffic are shared on a common network, according to one or more disclosed implementations.
Figure 3B:
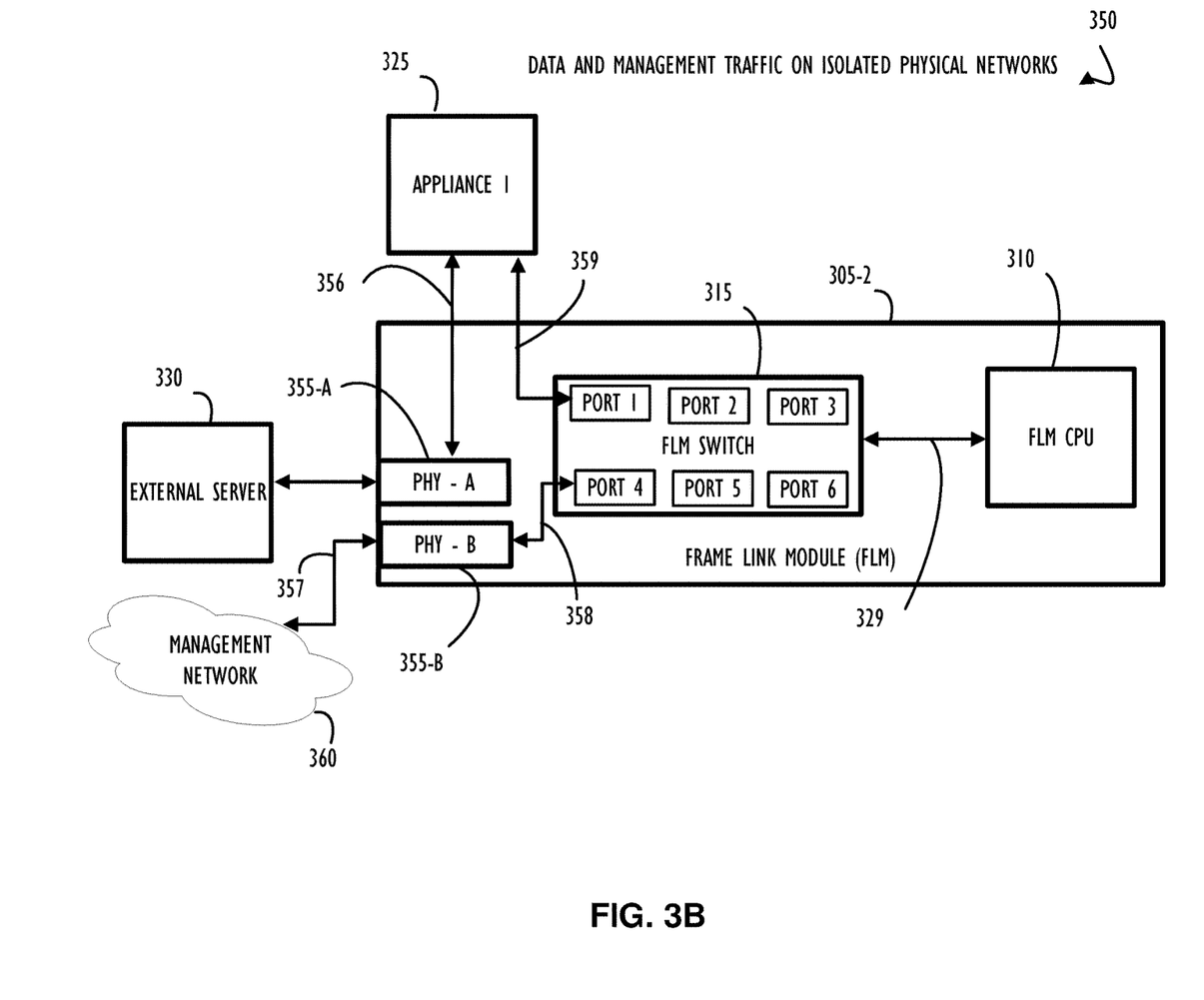
FIG. 3B is a functional block diagram extending the example of FIG. 3A where data and management traffic are isolated on different networks, according to one or more disclosed implementations.

FIG. 3A is a functional block diagram illustrating communication flow 300 where data and management traffic are shared on a common physical network (and may be logically isolated using VLANs), according to one or more disclosed implementations. For simplicity, communication flow 300 is not illustrated with redundant FLM modules as may be provided in a production implementation and described above for FIGS. 2A-B. In communication flow 300, communication path 327 illustrates a bi-directional communication path between an external server 330 (which may be an application server providing a set of functionalities for a customer network) and FLM 305-1. The connection utilizes PHY 320 that is connected to port 4 of a multi-port FLM switch 315. FLM switch 315 is illustrated in this example as having 6 ports but any number of ports are possible depending on design criteria for an FLM switch. Appliance 1 325 is illustrated as utilizing communication path 326 as a bi-directional communication path to port 1 of FLM switch 315 on FLM 1 (305-1). FLM 305-1 further illustrates FLM CPU 310 having a bi-directional communication path 329 to FLM switch 315. As explained throughout this disclosure, FLM CPU 310 may execute computer instructions to configure FLM switch 315 based on desired communication capabilities of a customer network environment. Also, in this example, data and management traffic may be shared on a single physical network and may be logically isolated on distinct VLANs (see FIG. 1).

FIG. 3B extends the example of FIG. 3A to illustrate communication flow 350 with isolated networks for data traffic (e.g., customer application data) and management traffic (e.g., management commands), according to one or more disclosed implementations. FIG. 3B includes elements of FIG. 3A that maintain their reference numbers to indicate they are like components. For example, FLM CPU 310, FLM Switch 315, external server 330, and appliance 1 (325) may not be different components between FIGS. 3A and 3B. However, additional components are illustrated to provide the illustrated data traffic segregation.

As illustrated in FIG. 3B, a physical separation of an application data network and management network 360 has been introduced. Although not specifically illustrated in communication flow 350, additional components (including appliance 1 325 (via link 359)) may be connected to management network 360. As discussed throughout this disclosure, management traffic may include control commands to devices and components to configure those devices/components and issue run-time control commands (e.g., fan control, power consumption, etc.) to affect an operational state of devices/components to which those control commands are sent. Further, control commands may originate at FLM CPU 310 or from other firmware/hardware/software executing within a customer enterprise. As illustrated, FLM 305-1 includes two PHYs, namely PHY-A 355-A and PHY-B 355-B that may be used to isolate management traffic (i.e., on PHY-B 355-B) from customer application data traffic (i.e., on PHY-A 355-A). As further illustrated, PHY-A 355-A may utilize communication path 356 to connect to PHY-A 355-A and may not be connected to FLM switch 315. Because, PHY-A may not be connected to FLM switch 315, it is possible to allow application data to bypass FLM switch 315 as necessary based on desired security configuration constraints of different production customer networks. In contrast, management network 360 is illustrated as connecting via communication link 357 to PHY-B 355-B and thus to port 4 (via communication link 358) on FLM switch 315. Management data for appliance 1 (325) may flow on link 359 through port 1 of FLM switch 315.

Figure 4:
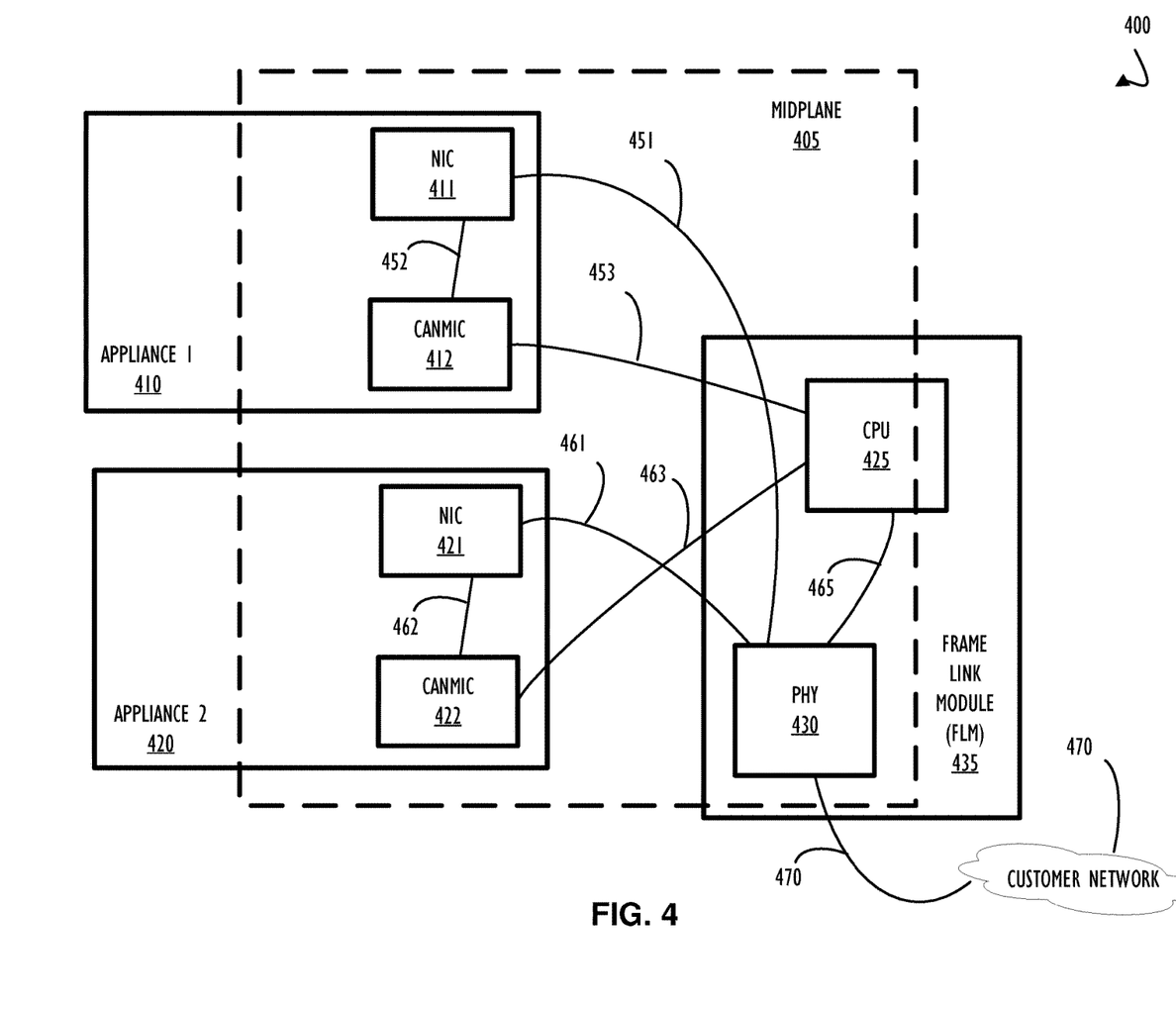
FIG. 4 is a functional block diagram illustrating two servers (appliances), each having a NIC and a control area network (CAN) microcontroller, a midplane and a frame link module, with different possible communication paths illustrated, according to one or more disclosed implementations.

Referring now to FIG. 4, component architecture 400 is illustrated as a functional block diagram including two appliances, each having a NIC and a control area network (CAN) microcontroller (CANMIC), a midplane and a frame link module, with different possible communication paths illustrated, according to one or more disclosed implementations. In this disclosed example, midplane 405 facilitates communication between components. A midplane 405 is a component, that in some cases, may be plugged into a frame of a scaleable compute resource.

In general, midplane 405 allows for the physical connections from the appliances to the FLM and routes the data and management port connections between devices. Accordingly, midplane 405 is illustrated by a dashed line in FIG. 4 that overlaps other components that midplane 405 may interact with. Although not shown in FIGS. 1-3B, a midplane components such as midplane 405 may be present as illustrated in FIG. 4. In some implementations, a midplane (such as midplane 405 in this example) may be designed to allow for plug-in of different versions of hardware and either achieve a full air gap segregation or not. Within midplane 405, individual connections allow for an air gap implementation, however achieving a full air gap security segregation will depend on capabilities and configuration of other components that communicate through midplane 405. As illustrated above in FIGS. 2A and 3A, some types of segregation of application data traffic and management data traffic may be accomplished through midplane 405. In other example implementations (e.g., FIGS. 2B and 3B), full air gap segregation may be achieved by leveraging additional architectural features of components (e.g., additional NICs in appliances). In either case, midplane 405 may support communication paths as configured via FLM CPU 310 and illustrated in FIGS. 1-4 of this disclosure.

As illustrated in component architecture 400 and mentioned above, an FLM CPU such as CPU 425 shown on FLM 435 of FIG. 4 may utilize various communication paths to configure appliance components and PHYs within an FLM. Communication path 465 from CPU 425 to PHY 430 represents the configuration of the system side and the line side of PHY 430. Application data flow to PHY 430 from Appliance 1 (410) utilizes communication path 451. Communication path 470 represents a line side connection between PHY 430 and customer network 470 (which although not shown may include a connection to appliance 1 410 and appliance 2 420). Specifically illustrated in component architecture 400 is a communication path 453 between CPU 425 and CANMIC 412 that represents an example of CANBUS communication that was introduced above. Similarly, communication path 463 represents a CANBUS communication path between CPU 425 and CANMIC 422 of appliance 2 420. Each of the communication paths utilizing a CANBUS (i.e., communication path 463 and 453) may be used to send configuration commands to a NIC within an appliance such as appliance 1 (410) and appliance 2 (420) of component architecture 400. That is, CANMIC 412 of appliance 1 (410) may receive configuration information as management traffic from CPU 425 via communication path 453. This configuration information may in turn be transmitted via communication path 452 from CANMIC 412 to NIC 411 and provide configuration information to NIC 411. A similar configuration information path exists for appliance 2 (420) using communication path 463 and communication path 462. In this example, remote management of a NIC may be accomplished via a CANBUS and thus provide another example of a technique to segregate management traffic from application data traffic within a scaleable compute resource such as a frame based system.

Figure 5:
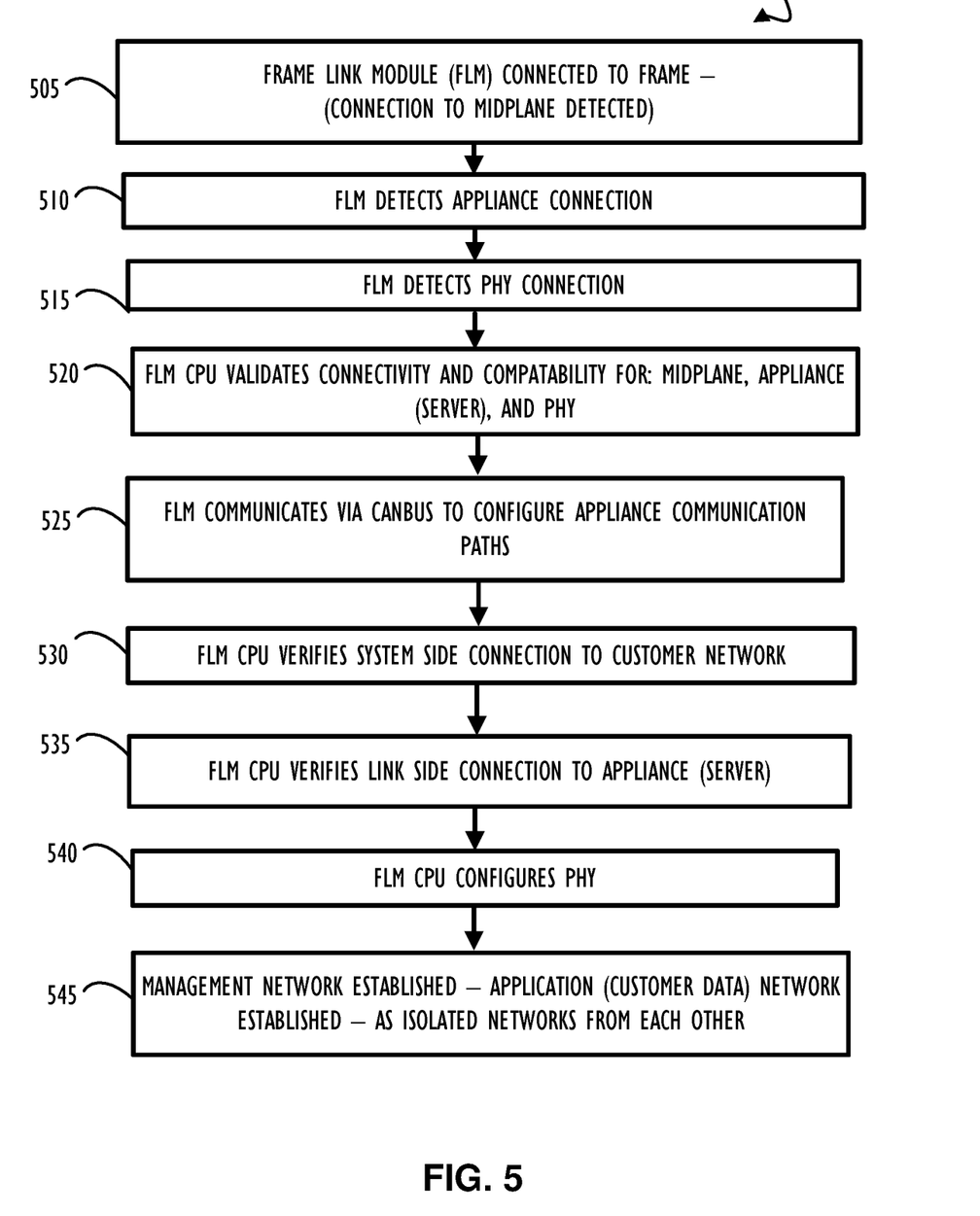
FIG. 5 illustrates a flow chart depicting one example method for configuring components of FIG. 4 to isolate data from a management network and a customer network, according to one or more disclosed implementations.

FIG. 5 represents an example method 500 for providing configuration of a segregated management network from an application data network (e.g., air gap isolation), according to one or more disclosed examples. FIG. 5 illustrates method 500 which begins at block 505 with a FLM connected to a frame scaleable compute resource and indicates that the FLM (e.g., FLM CPU) may detect a connection to a midplane. Block 510 indicates that the FLM may detect an appliance connection. Block 515 indicates the FLM detects a PHY connection. Of course, the order of each detection may occur in an order different than the order of this example. Upon detection, each component may be interrogated to obtain operational characteristics of the detected component. For example, a field replaceable unit (FRU) designation may be obtained from the component and used to determine capabilities of that component. Other operational information may also be obtained if available.

Block 520 indicates that the FLM CPU may validate connectivity and compatibility for each detected component. Block 525 indicates that the FLM may communicate via a CAN bus (if appropriate) to configure appliance control communication paths through a segregated physical network (e.g., air gap). Block 530 indicates that a system side connection to a customer network may be verified. Block 535 indicates that a link side connection to an appliance may be verified. Block 540 indicates that the FLM CPU may configure one or more available PHYs. For example, the FLM CPU may configure a component architecturally configured to support a full air gap isolation of networks using a CAN bus (via a CANMIC) as discussed above (see FIG. 4) or may configure a component to a best available security configuration for that component. Block 545 indicates that, once a management network and application data network are configured, the scaleable compute resource will use these communication paths as appropriate for each type of data. In some cases, there may be separate physical networks to represent a full air gap isolation or there may be a logical isolation (e.g., using separate VLANs).

Figure 6:
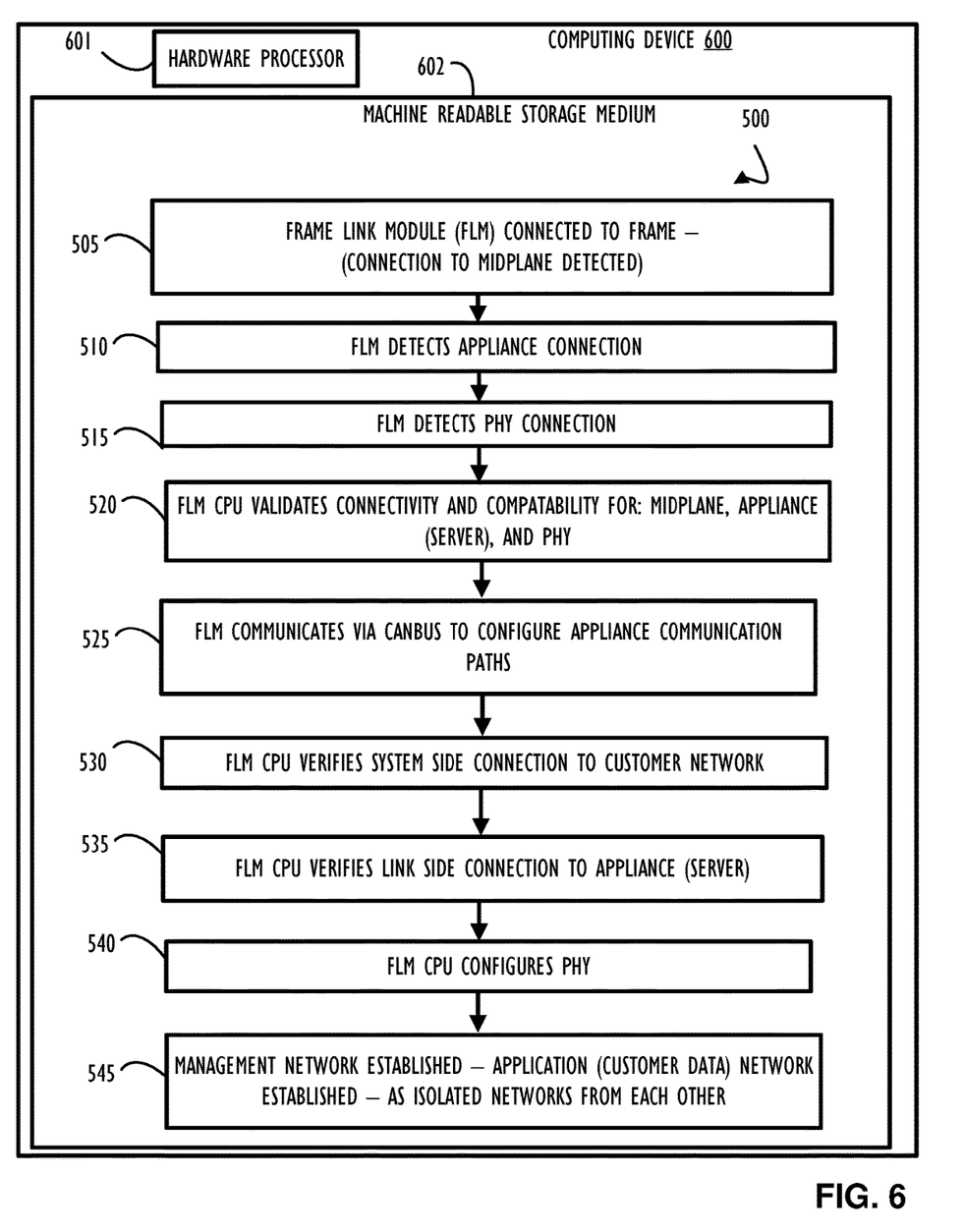
FIG. 6 illustrates an example computing device instrumented with computer instructions to perform the method of FIG. 5, according to one or more disclosed examples.

FIG. 6 is an example computing device 600, with a hardware processor 601 (e.g., FLM CPU 310 of FIG. 3), and accessible machine-readable instructions stored on a machine-readable medium 602 for implementing one example configuration of NICs for network isolation within a scaleable compute resource, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 505-545 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

One of skill in the art, given the benefit of this disclosure, will recognize that the disclosed techniques represent several benefits to improve the art of system administration and improve the functioning and security of the overall scalable compute resource. These benefits include, but are not limited to, segregation of network management traffic from customer application data; and reuse of existing infrastructure components (including backward compatibility to components that may not be architecturally configured to recognize complete air gap isolation as disclosed). In a case where a component is not architecturally constructed to include additional NICs (e.g., FIG. 2A), disclosed management software techniques (e.g., the method of FIG. 5) may allow that component to function within the system using a best possible security configuration (e.g., isolation but not complete air gap isolation). Thus, disclosed techniques may be implemented without forcing complete system upgrade for all components concurrently within a customer enterprise and allow customer a migration path to enhanced security.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method for dynamically configuring network isolation between two networks, the method comprising:
   detecting, by a frame link module (FLM), a first appliance connection to a frame scaleable compute resource;
   detecting a first PHY connection on a multi-port PHY interface of the FLM;
   validating, using an FLM central processing unit (CPU), compatibility for the first appliance, a midplane, and the first PHY connection;
   initiating configuration commands to a first network interface card (NIC) port of the first appliance to configure a first network for application data;
   initiating configuration commands to a second NIC port of the first appliance to configure a second network for management data, wherein the first NIC port and the second NIC port are on a first NIC and the configuration commands are delivered to the first NIC via a controller area network (CAN) bus; and
   initiating communication on the first network and the second network,
   wherein the management data is maintained and transmitted on the second network, internally within the scaleable compute resource, and the application data is transmitted on the first network, and
   wherein the first network is isolated from the second network by the midplane.

2. The computer-implemented method of claim 1, wherein:
   the first network and the second network are logically isolated.

3. The computer-implemented method of claim 1, wherein logical isolation of networks is provided using independent VLANs of the scaleable compute resource.

4. The computer-implemented method of claim 1, wherein the configuration commands are initiated in response to detection of attachment of the first appliance while the scaleable compute resource is running.

5. The computer-implemented method of claim 1, wherein the configuration commands are initiated as part of a startup boot sequence for the scaleable compute resource.

6. The computer-implemented method of claim 1, further comprising:
   detecting a second PHY connection on the multi-port PHY interface of the FLM;
   validating, using the FLM CPU, compatibility for the first appliance, the midplane, and the second PHY connection;
   initiating configuration commands to a second NIC, different from the first NIC, on the first appliance, the second NIC including a second NIC first port and a second NIC second port;
   using the configuration commands to the second NIC to configure a third network for management data as a redundant management data network to the second network using the second NIC first port; and
   using the configuration commands to the second NIC to configure a fourth network for application data, as a redundant application data network to the first network, using the second NIC second port,
   wherein each application data network maintains physical isolation from each management data network on all components within the scaleable compute resource.

7. The computer-implemented method of claim 6, wherein the physical isolation of each of the management data network and the redundant management data network from each of the application data network and the redundant application data network includes air gap equivalent isolation and electrical signals of each management data network and each application data network are isolated based on type, within the scaleable compute resource, from being present on any single physical network media transport.

8. The computer-implemented method of claim 6, wherein the configuration commands to the second NIC are initiated in response to detection of attachment of the first appliance and a determination by the FLM CPU that the first appliance includes multiple NICs.

9. The computer-implemented method of claim 6, wherein the configuration commands for the second NIC are delivered to the second NIC via a controller area network (CAN) bus.

10. The computer-implemented method of claim 6, wherein the configuration commands for the second NIC are initiated in response to detection of attachment of the first appliance while the scaleable compute resource is running.

11. The computer-implemented method of claim 6, wherein the configuration commands for the second NIC are initiated as part of a startup boot sequence for the scaleable compute resource.

12. A non-transitory computer readable medium comprising computer executable instructions that, when executed by one or more processing units, cause the one or more processing units to:
    detect, by a frame link module (FLM), a first appliance connection to a frame scaleable compute resource;
    detect a first PHY connection on a multi-port PHY interface of the FLM;
    validate, using an FLM central processing unit (CPU) as one of the one or more processing units, compatibility for the first appliance, a midplane, and the first PHY connection;
    initiate configuration commands to a first network interface card (NIC) port of the first appliance to configure a first network for application data;
    initiate configuration commands to a second NIC port of the first appliance to configure a second network for management data, wherein the first NIC port and the second NIC port are on a first NIC and the configuration commands are delivered to the first NIC via a controller area network (CAN) bus; and
    initiate communication on the first network and the second network,
    wherein management data is maintained and transmitted on the second network, internally within the scaleable compute resource, and the application data is transmitted on the first network, and
    wherein the first network is isolated from the second network by the midplane.

13. The non-transitory computer readable medium of claim 12, further comprising computer executable instructions that, when executed by one or more processing units, cause the one or more processing units to:
    initiate configuration commands to a first NIC including the first NIC port responsive to detection of attachment of the first appliance while the scaleable compute resource is running.

14. The non-transitory computer readable medium of claim 12, further comprising computer executable instructions that, when executed by one or more processing units, cause the one or more processing units to:
    detect a second PHY connection on the multi-port PHY interface of the FLM;
    validate, using the FLM CPU, compatibility for the first appliance, the midplane, and the second PHY connection;
    initiate configuration commands to a second NIC, different from the first NIC, on the first appliance, the second NIC including a second NIC first port and a second NIC second port;
    use the configuration commands to the second NIC to configure a third network for management data as a redundant management data network to the second network using the second NIC first port; and
    use the configuration commands to the second NIC to configure a fourth network for application data as a redundant application data network to the first network using the second NIC second port,
    wherein each application data network maintains physical isolation from each management data network on all components within the scaleable compute resource.

15. A frame link module (FLM) within a scaleable compute resource, the FLM comprising:
    an FLM central processing unit (CPU);
    a multi-port PHY interface communicatively coupled to the FLM CPU;
    a midplane providing connectivity between the FLM CPU, the multi-port PHY interface, and one or more appliances connected to the scaleable compute resource; and
    a data storage area to store executable instructions to be executed by the FLM CPU, wherein the executable instructions, when executed by the FLM CPU cause the FLM CPU to:
        detect a first appliance connection, from the one or more appliances, to a frame of the scaleable compute resource;
        detect a first PHY connection on the multi-port PHY interface;
        validate compatibility for the first appliance, the midplane, and the first PHY connection;
        initiate configuration commands to a first network interface card (NIC) port of the first appliance to configure a first network for application data;
        initiate configuration commands to a second NIC port of the first appliance to configure a second network for management data, wherein the first NIC port and the second NIC port are on a first NIC and the configuration commands are delivered to the first NIC via a controller area network (CAN) bus; and
        initiate communication on the first network and the second network,
        wherein management data is maintained and transmitted on the second network, internally within the scaleable compute resource, and application data is transmitted on the first network, and
        wherein the first network is isolated from the second network by the midplane.

16. The FLM of claim 15, wherein the executable instructions, when executed by the FLM CPU cause the FLM CPU to:
    detect a second PHY connection on the multi-port PHY interface;
    validate compatibility for the first appliance, the midplane, and the second PHY connection;
    initiate configuration commands to a second NIC, different from the first NIC, on the first appliance, the second NIC including a second NIC first port and a second NIC second port;
    use the configuration commands to the second NIC to configure a third network for management data as a redundant management data network to the second network using the second NIC first port; and
    use the configuration commands to the second NIC to configure a fourth network for application data as a redundant application data network to the first network using the second NIC second port, wherein
    each application data network maintains physical isolation from each management data network on all components within the scaleable compute resource.

* * * * *